(12) United States Patent
Garg et al.

(10) Patent No.: US 11,012,348 B2
(45) Date of Patent: *May 18, 2021

(54) TRAFFIC SHAPING AND END-TO-END PRIORITIZATION

(71) Applicant: Parallel Wireless, Inc., Nashua, NH (US)

(72) Inventors: Sumit Garg, Hudson, NH (US); Gaurav Kumar, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,222

(22) Filed: Apr. 7, 2020

(65) Prior Publication Data
US 2020/0274796 A1    Aug. 27, 2020

Related U.S. Application Data

(63) Continuation of application No. 15/803,737, filed on Nov. 3, 2017, now Pat. No. 10,616,100.

(60) Provisional application No. 62/417,109, filed on Nov. 3, 2016.

(51) Int. Cl.
| | |
|---|---|
| *H04L 12/24* | (2006.01) |
| *H04L 12/26* | (2006.01) |
| *H04L 12/721* | (2013.01) |
| *H04L 12/801* | (2013.01) |
| *H04L 12/815* | (2013.01) |
| *H04L 12/707* | (2013.01) |
| *H04L 29/06* | (2006.01) |
| *H04L 12/851* | (2013.01) |
| *H04L 12/863* | (2013.01) |

(Continued)

(52) U.S. Cl.
CPC .......... *H04L 45/38* (2013.01); *H04L 41/0663* (2013.01); *H04L 43/10* (2013.01); *H04L 45/22* (2013.01); *H04L 45/741* (2013.01); *H04L 47/14* (2013.01); *H04L 47/18* (2013.01); *H04L 47/22* (2013.01); *H04L 47/2408* (2013.01); *H04L 47/2441* (2013.01); *H04L 47/31* (2013.01); *H04L 47/50* (2013.01); *H04L 63/0236* (2013.01); *H04L 63/0272* (2013.01); *H04L 69/22* (2013.01)

(58) Field of Classification Search
None
See application file for complete search history.

(56) References Cited

U.S. PATENT DOCUMENTS

2014/0226482 A1    8/2014    Lv

*Primary Examiner* — Robert M Morlan
(74) *Attorney, Agent, or Firm* — Michael Y. Saji; David W. Rouille

(57) ABSTRACT

A method is disclosed, comprising: receiving a first and a second Internet Protocol (IP) packet at a mesh network node; tagging the first and the second IP packet at the mesh network node based on a type of traffic by adding an IP options header to each of the first and the second IP packet; forwarding the first and the second IP packet toward a mesh gateway node; filtering the first and the second IP packet at the mesh gateway node based on the added IP options header by assigning each of the first and the second IP packet to one of a plurality of message queues, each of the plurality of message queues having a limited forwarding throughput; and forwarding the first and the second IP packet from the mesh gateway node toward a mobile operator core network, thereby providing packet flow filtering based on IP header and traffic type.

13 Claims, 11 Drawing Sheets

(51) Int. Cl.
*H04L 12/749* (2013.01)
*H04L 12/833* (2013.01)

* Indicates message has IP Options headers of type 222

TRAFFIC SHAPING AND END-TO-END PRIORITIZATION

CROSS-REFERENCE TO RELATED APPLICATIONS

This application is a continuation under 35 U.S.C. § 120 of U.S. patent application Ser. No. 15/803,737, filed Nov. 3, 2017, and entitled "TRAFFIC SHAPING AND END-TO-END PRIORITIZATION," which itself is a non-provisional conversion of, and claims the benefit of priority under 35 U.S.C. § 119(e) of, U.S. Provisional Pat. App. No. 62/417, 109, titled "Traffic Shaping for Mesh Backhaul" and filed on Nov. 3, 2016, which is also hereby incorporated by reference in its entirety for all purposes. This application also hereby incorporates by reference U.S. patent application Ser. No. 15/607,425, "End-to-End Prioritization for Mobile Base Station," filed May 26, 2017, in its entirety for all purposes. This application also hereby incorporates by reference for all purposes the most recent versions of the following documents dated as of the priority date of the present application: IETF RFC 2474; IETF RFC 2475; IETF RFC 3260; IETF RFC 4727; 3GPP TS 23.401; 3GPP TS 24.301; 3GPP TS 24.008. This application also hereby incorporates by reference for all purposes U.S. Pat. App. Pub. Nos. US20150092688; US20140192643; US20150009822; US20140086120; US20140133456; US20140233412; US20150078167; US20150257051; US20160373958; and WO2013145592.

BACKGROUND

It is possible to create a Long Term Evolution (LTE) network where certain base stations are backhauled using a mesh network, such as a wireless, Wi-Fi or LTE-based backhaul connection. Depending on usage by mobile subscribers, the number of base stations being backhauled, available bandwidth, applications running, traffic activity on various user equipment devices, severe traffic or bad radio connections, congestion may occur at one or more mesh network links or backhaul links. Congestion may of course adversely impact network operations and providing reasonable service.

The radio access network generally has traffic of different kinds, such as wired or wireless internet traffic, 3G/4G Voice/Data, signaling traffic such as S1, X2, Iu, radio access bearer assignment, operations administrations and management, etc.; and each type of traffic has its own mechanism to indicate priority of the message. The traffic is generally transported over private virtual private network tunnels, e.g. using IPSec, and are therefore encrypted and encapsulated. This may make it more difficult to prioritize packet flows during routing, as the nodes along the route are not able to determine the category of the particular message and route based on the priority assigned by the source node in the event of congestion.

A solution is therefore needed for prioritizing messages of different categories based on a single identification mechanism. The solution is needed to maintain the original priority information assigned by one or more source nodes where the messages first originated, and to enable various nodes to route the message according to the original priority without de-encapsulation or de-encryption.

SUMMARY

Systems and methods for traffic shaping and end-to-end prioritization in a telecommunications network are disclosed.

In a first embodiment, a method is disclosed, comprising: receiving a first and a second Internet Protocol (IP) packet at a mesh network node; tagging the first and the second IP packet at the mesh network node based on a type of traffic by adding an IP options header to each of the first and the second IP packet; forwarding the first and the second IP packet toward a mesh gateway node; filtering the first and the second IP packet at the mesh gateway node based on the added IP options header by assigning each of the first and the second IP packet to one of a plurality of message queues, each of the plurality of message queues having a limited forwarding throughput; and forwarding the first and the second IP packet from the mesh gateway node toward a mobile operator core network, thereby providing packet flow filtering based on IP header and traffic type. The method may further comprise receiving a third IP packet from a second mesh network node; and filtering the third IP packet at the mesh gateway node. The method may further comprise receiving the first IP packet from a cellular access network and the second IP packet from a wireless local area network access network. The method may further comprise receiving the first and the second IP packet from a plurality of user devices on at least two of a Long Term Evolution (LTE) eNodeB, a Universal Mobile Telecommunications System (UMTS) nodeB, a non-UMTS 3G base station, a Wi-Fi access point, or an IP-based telephony device. The method may further comprise subsequently removing the IP options header at the mesh gateway node. The method may further comprise tagging based on the type of traffic for each of the first and the second IP packets and also based on at least one of, for each of the first and the second IP packets, a differentiated services code point (DSCP) value, an IP type of service (ToS) value, or a quality of service class identifier (QCI). The method may further comprise evaluating a differentiated services code point (DSCP) value or IP type of service (ToS) value of each of the first and the second IP packets; evaluating the type of traffic for each of the first and second IP packets; and ignoring the DSCP value or IP ToS value for purposes of tagging. The method may further comprise receiving the first and the second IP packets at a second mesh network node and forwarding the first and the second IP packets toward the mesh gateway node without removing the added IP options headers. The IP options header may be an IPv4 option or an IPv6 extension header. The plurality of message queues may each be logical queues within an IP processing layer at the mesh gateway node, and wherein messages in the message queues are output onto a network link based on a desired traffic shaping policy.

In a second embodiment, a mesh gateway node is disclosed, comprising: an inbound interface for receiving data from a mesh network node, the mesh network node configured as a base station for providing wireless access to mobile devices; an outbound interface for sending data toward a mobile operator core network; and a processor configured to: receive a first and a second Internet Protocol (IP) packet at a mesh network node; tag the first and the second IP packet at the mesh network node based on a type of traffic by adding an IP options header to each of the first and the second IP packet; forward the first and the second IP packet toward a mesh gateway node; filter the first and the second IP packet at the mesh gateway node based on the added IP options header by assigning each of the first and the second IP packet to one of a plurality of message queues, each of the plurality of message queues have a limited forwarding throughput; and forward the first and the second IP packet from the mesh gateway node toward a mobile operator core network.

In a third embodiment, a non-transitory computer-readable medium is disclosed comprising instructions which, when executed by a processor in a mesh gateway node, cause the mesh gateway node to perform steps comprising: receiving a first and a second Internet Protocol (IP) packet from a mesh network node, the first and the second IP packet previously tagged at the mesh network node based on a type of traffic by adding an IP options header to each of the first and the second IP packet; filtering the first and the second IP packet at the mesh gateway node based on the added IP options header by assigning each of the first and the second IP packet to one of a plurality of message queues, each of the plurality of message queues have a limited forwarding throughput; and forwarding the first and the second IP packet from the mesh gateway node toward a mobile operator core network.

In a fourth embodiment, a non-transitory computer-readable medium is disclosed comprising instructions which, when executed by a processor in a mesh network node, cause the mesh network node to perform steps comprising: receiving a first and a second Internet Protocol (IP) packet at the mesh network node; tagging the first and the second IP packet at the mesh network node based on a type of traffic by adding an IP options header to each of the first and the second IP packet; and forwarding the first and the second IP packet toward a mesh gateway node for further filtering based on the added IP options header by assigning each of the first and the second IP packet to one of a plurality of message queues, each of the plurality of message queues have a limited forwarding throughput, and for forwarding toward a mobile operator core network.

DETAILED DESCRIPTION

Figure 1:
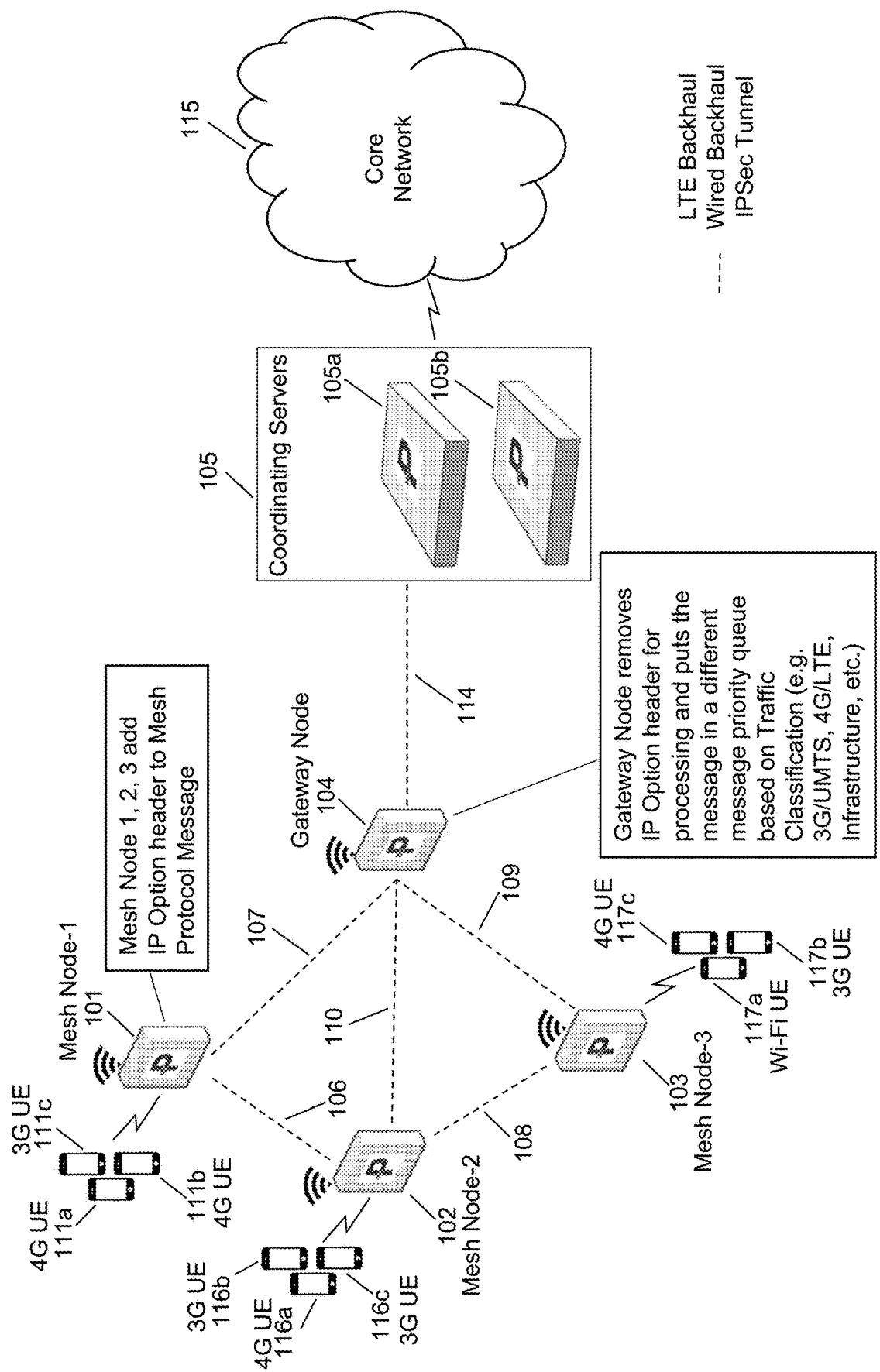
FIG. 1 is a network diagram in accordance with some embodiments.

The detailed description set forth below is intended as a description of various configurations of the subject matter and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details. In some instances, well-known structures and components are shown in block diagram form in order to avoid obscuring the concept of the subject technology.

Overview

It is possible to use multiple forms of backhaul to connect to a core network from a base station, including wired, LTE, microwave, satellite, etc. For example, in the Parallel Wireless architecture, in the 3G architecture, and in recent proposed versions of the 5G architecture, a base station communicates with a coordinating node located between the radio access network (RAN) and the core network. In the situation where a base station uses a wireless backhaul link, communications from the base station to the coordinating node may flow through a secured tunnel through the intermediary nodes before reaching the coordinating node and entering into an unencrypted core network environment. For wireless backhaul using Long Term Evolution (LTE), the base station may have an onboard LTE modem, in some embodiments, which can attach to an existing LTE network and provide IP connectivity.

It is also possible to use a mesh network to connect to a core network from a base station to provide backhaul. A mesh network includes several mesh nodes, which flexibly route traffic to an appropriate point of egress for the traffic; benefits of a mesh network include resiliency, since any failures can be routed around, and congestion tolerance, as congestion is tolerated as is any other failure. However, mesh networks typically have a few nodes that are connected more directly to the core network or with more robust, higher throughput, or higher availability backhaul links to the core network, and these nodes, called mesh gateway nodes, can become overwhelmed when they provide backhaul capability to a large number of mesh nodes. For example, if each mesh node is providing wireless connectivity/access to a handful of mobile devices, any one mesh node can be backhauled by a mesh gateway node without issue, but the mesh gateway node may become congested when a large number of mesh nodes is backhauled by a single mesh gateway node. The mesh network may include one or more wireless links.

The base station may use IPSec to secure its connectivity to the coordinating node. All signaling and data may be encrypted when it leaves the base station and coordinating node. Encryption results in an intermediary node becoming unable to provide Quality of Service Class Identifier (QCI) specific treatment for traffic that did not originate at the intermediary node because the intermediary node is not able to decrypt the encapsulated message sent by the original sender base station. This may create a problem when there is congestion in a mesh link network, or the uplink, and treatment based on the priority as identified by the sender base station or the coordinating server or mobile core network cannot be provided.

This solution makes possible to prioritize traffic based on class of traffic (streaming/interactive etc.) This solution makes possible to shape traffic based on transport and usage, for e.g. LTE or 3G data vs. Infrastructure. This solution can also add categories/transports etc. This solution makes possible to reserve certain band-width for infrastructure traffic which will also be the highest priority. Signaling traffic as defined above would/might also get separate bandwidth or at-least a QCI map (for LTE backhaul). This solution makes possible to limit the signaling traffic from 1 transport so that it does not take down all the others in case of adverse network conditions or scenarios like LTE paging flood. This solution makes possible to shape Data traffic for each transport (LTE, 3G etc.) independently. This solution makes possible to special handling to certain priorities (e.g. VoLTE traffic), similarly certain access categories/classes like emergency bearer might require special handling. The DSCP values for the user traffic could be preserved.

The present disclosure addresses Traffic Prioritization, Traffic Classification, Traffic Shaping and Traffic Estimation. Each of traffic prioritization, traffic shaping, and traffic estimation is discussed in detail below.

Traffic Prioritization, Traffic Classification

Traffic prioritization refers to the overall effect of the combination of traffic classification and traffic shaping. Traffic prioritization occurs both at mesh nodes (mesh network nodes) and mesh gateway nodes. However, traffic prioritization is achieved differently at the mesh network node and at the mesh gateway node.

Traffic classification is an independent activity that may be performed at any source node or intermediate node, and involves identification and classification of traffic into various priorities on the basis of its criticality to the network, which results in labels or tags associated with packet flows that may be variously mapped and shaped as the traffic traverses the network. Traffic classification may be referred to as tagging, as each packet is tagged with prioritization/classification information for use by another system performing traffic shaping.

Traffic classification at the mesh network node may utilize an IP Options header as discussed below that is added to the IP packet header of each packet. This results in classification that can be used even for encapsulated data. For example, in the scenario where an IPSec tunnel is established with endpoints at the originating mesh network node and the core network, any other mesh network node that may be involved via a mesh network link or the mesh gateway node is enabled to use the IP Options header, as this header appears on every IP packet, including encapsulated or encrypted packets.

IP Headers are defined and known in the art in the IPv4 and IPv6 specifications. These protocols permit the use of a header field called options. These options fields may generally include one or more IP Options fields (or headers), or as many IP Options header as needed.

In some embodiments, an IPv4 IP Options header is defined herein for traffic classification and prioritization. The header is four bytes long to avoid any padding. The first byte of the IP Options header is coded as value 222 (0xDE). The most significant bit (MSB) is bit 7 and the least significant bit (LSB) is bit 0. Bit 7 defines the value for the copied field. The value 1 indicates if the message is fragmented, the IP Options header needs to be copied in each fragmented message. Bit 7 and 6 represents the value for the class field. Class field is set to value 2. The remaining five bits represents number and is set to 30. The second octet represents length of IP Options header and is set to 2. The third octet is unused and all bits of the third octet are set to 0. The fourth octet represents Traffic Classification (TC). TC may have value from 0 to 255. Different TC values may be assigned to different kind of messages.

In other embodiments, an IPv6 header field may be used. The inventors have appreciated that various techniques for implementing IP header fields may be used for different versions of IP and other protocols, such as future versions of IP, or any other datagram-based protocols with headers. IPv6 headers are able to have variable lengths, and are able to include additional headers, similar to the manner in which multiple IP Options fields may be included in an IPv4 header.

Some of the traffic classification values that may be encoded in the fourth octet of the IP Options header are shown below.

Unclassified: 0
Mesh Infrastructure (or Vendor-Specific Infrastructure): 1
Mesh Signaling (or Vendor-Specific Signaling): 2
Mesh Data (cores etc.) (or Vendor-Specific Data): 3
Long Term Evolution (LTE) traffic: 4
Universal Mobile Telecommunication System (UMTS)/3G traffic: 5
LAN Access Group 1: 6
Wi-Fi Access Group (AG) 0: 7 (multiple access groups may be defined by the infrastructure provider)
Wi-Fi AG 1: 8
Wi-Fi AG 2: 9
Wi-Fi AG 3: 10
Reserved: 11 through 255

Addition of the IP Options header field allows shaping of the traffic independently of other priority parameters, such as Differentiated Services Code Points (DSCP) or 3GPP-based QCI parameters, which may not be able to be efficiently determined due to encapsulation. Also, as IP header fields can be passed on and relayed, marking and reclassifying traffic at every hop may not be required.

Another feature of the use of the IP Options header field is that IP is well-understood and many tools exist to perform filtering, shaping, and processing on IP packets based on IP packet headers. For example, the netfilter architecture may be extended to add or remove the IP Options header using the mangle table in post-routing and pre-routing chains. The IP Options header would be added and removed to the outermost IP header, using marking. Other IP processing architectures could be used, such as iptables, pcap, pf, nftables, or another implementation. These packet processing architectures often enable creation and management of packet queues, and flexible assignment of packets to queues, which are used by the present disclosure. Implementation steps of adding a field to an IP header and adding packets into queues are well-understood using the abovementioned packet processing architectures. Implementation using netfilter, iptables, etc. may be performed in software, or alternately implemented in hardware, as well-understood by persons of skill in the art.

Traffic prioritization or classification may be based on class of traffic for example streaming or interactive traffic etc.

Different traffic classes are discussed below.

Infrastructure Traffic

The infrastructure traffic is messages flowing between the mesh network node and the coordinating server. For example, ICMP traffic over WAN interface, Babel packets (mesh network routing protocol route sharing packets) from one mesh network node to other mesh network node, and Layer-2 pings to check availability of mesh link between two mesh network nodes are classified as infrastructure traffic. Heartbeat messages between the mesh network node and the coordinating server at signaling connection transport protocol (SCTP) protocol layer, IPSec layer, General Packet Radio Service (GPRS) Tunneling Protocol (GTP) layer, and configuration manager (ConfigMgr) etc. are also classified as infrastructure traffic. The message is generally classified as infrastructure traffic if it required to keep the network running and providing services. The failure of timely heartbeat message may trigger the action appropriate to failure in the network such as switchover to redundant node and cause service interruptions.

ICMP traffic over the WAN interface; Babel packets from mesh node to mesh node; Layer-2 pings from mesh node to mesh node (tests availability of individual mesh links); ConfigMgr heartbeats between a mesh node and the RAN controller; SCTP heartbeats between a mesh node and the RAN controller; IPsec IKEv2 traffic between a mesh node and the RAN controller; GTP Heartbeat; etc. may be classified as infrastructure traffic.

Infrastructure traffic is typically kept at a minimum level based on what is needed to be supported to keep the services up, without causing large scale disruptions in the network. Just as an example, if the SCTP heartbeat is not prioritized the result may be that a cell could go down, removing the traffic completely. This in turn would allow the heartbeat to succeed and bring the cell up and bringing the traffic back. However, this is not ideal; the network disruptions caused by this intermittent cell might cause more harm than value it brings to the network.

Additionally, messages critical for operations, administrations, and management (OAM) are also classified as infrastructure traffic. Some examples of OAM traffic are network performance key performance indicators (KPIs) and statistics, administrative and operational commands, network interference statistics and other performance measurement statistics such as drop call, handover etc., mesh network statistics and signal to interference noise ratio (SINR) etc., SON power control commands, administrative commands to bring a cell down, etc. are classified as infrastructure traffic. Configuration and other administrative commands over command line interface (CLI), simple network management protocol (SNMP), or network management control using webservices etc. may also be classified as infrastructure traffic.

In particular, in the Parallel Wireless™ architecture, or in another architecture wherein RAN nodes are managed by a RAN controller, communications between the RAN nodes and the RAN controller may be designated infrastructure traffic.

Emergency calls or 4G voice traffic using Voice over LTE (VoLTE) may also be accorded the highest priority and may be given the same priority given to messages belonging to infrastructure traffic category.

Signaling Traffic

Signaling Traffic represents control traffic for various access services. Some of the operational traffic may also be categorized as signaling traffic. Examples of signaling traffic are S1 and X2 protocol messages for 4G, Iu protocol messages for 3G, etc. Example operational traffic that may be also encoded as signaling traffic for Traffic Classification field of the IP Options header are configuration, statistics, ssh access for field support, etc.

Voice Traffic

This is user voice traffic. 3G voice related messages or packets may be assigned traffic classification of voice or UMTS in the IP Options header. 4G Voice/VoLTE may also be identified as voice traffic or may be assigned as voice or may be assigned as data.

Data Traffic

This is user data traffic. 4G Data, 3G Data using circuit switching or packet switching, Wi-Fi, Local Area Network (LAN) access, Generic Routing Encapsulation (GRE) traffic etc. are classified as Data in the Traffic Classification field of the IP Options header.

Additionally, messages or packets related to ftp of core dumps, logs, ping operations and other bulk data etc. may also be classified as Data in the Traffic Classification field of the IP Options header.

For all the above varieties of traffic, it is noted that multiple layers of infrastructure are involved, particularly when vendor-specific infrastructure is layered on top of 3GPP infrastructure, and when tunneling and encapsulation is involved. The use of an IP Option field with 8 bits of space allows the network operator to configure and prioritize traffic from each infrastructure layer independently with 255 possible traffic types. This is an advantage over DSCP, which uses 6 bits for the entire DSCP code point in the DS field, but typically uses only 3 bits for identifying DiffServ classes, such that typically only 6 classes of traffic can be differentiated. This is particularly helpful given that DSCP can be combined with the IP Option header field.

Traffic Prioritization in Mesh Transport

The IP Options header described above provides useful benefits to transport marking/classification done at the source mesh network node to the mesh gateway node. Using just Differential Services Code Point (DSCP) values does not provide the effective solution and becomes a lot more complicated. However, if the traffic prioritization and traffic shaping is done at the same node, the use of IP Options header may not be required. Also, the use of IP Options header may not be required when the shaping is done towards the core network and in the scenarios involving mobile-nodes that are not using mesh network.

In a typical mesh network of base stations (mesh network nodes and mesh gateway nodes), the bottleneck issue may arise at the mesh gateway node and not at the mesh network nodes. The mesh links are generally regarded for computational simplicity and efficiency in mesh routing calculation purposes as having unlimited capacity compared to uplink from the mesh gateway node to the core network via the coordinating server or the macro base station. Granular controls for the individual mesh network nodes may end up under-utilizing the overall bandwidth and may create a perception that 3G is faster than 4G if a node only generated 3G as compared to a node operating both 3G and 4G. To solve this, tagging is performed at the mesh nodes and shaping (filtering) is performed at the mesh gateway node, in some embodiments.

Messages sent over mesh network link may also have DSCP/TOS value set in addition to IP Options header with traffic classification. While traffic classification in the IP Options header may help in traffic shaping (discussed below), DSCP/TOS values are used by Wi-Fi driver to transmit the messages. The Wi-Fi driver uses the upper three bits from the DSCP field as a class selector as shown below.

CS0 (000) or CS3 (011)--->best-effort
CS1 (001) or CS2 (010)--->background
CS4 (100) or CS5 (101)--->video
CS6 (110) or CS7 (111)--->voice The voice access class has the highest transmit priority, followed by video, background and finally best-effort.

Traffic Shaping

Traffic shaping may generally be done at the mesh gateway nodes. Traffic shaping at the mesh network nodes, other than mesh gateway node may also be done; however, traffic shaping at the mesh network nodes may not be useful/required in the rural deployments. Traffic shaping queues the traffic classified during the traffic classification or traffic prioritization step into queues as defined by the shaping profiles. The purpose of traffic shaping is that the messages that have been marked as having higher priority at traffic classification step get preference over other messages under congestion or lack of resources.

Additionally, traffic shaping may also be done at the coordinating server as well as base stations acting as a mesh network node or mesh gateway node. That also means, traffic prioritization may also be done at the coordinating server as described above.

As used herein, a data flow or packet flow refers to a series of packets that are related to each other and have the same traffic type, for example, packets relating to the same voice call. Although it is difficult to identify a packet flow based on individual packets, the bandwidth required for certain types of data flows (i.e., voice; infrastructure) is well known, and so budgeting for a particular number of flows may be used to perform traffic shaping.

Traffic shaping uses queuing discipline to categorize traffic. Egress traffic may be sorted into various queues, each with its own priority, size, rate, and latency criteria. The shaping algorithms try to limit traffic from each of these queues in order to get the best overall experience. The goal is to utilize the complete egress pipe while not choking any particular flow (unless of course it is for world peace and the betterment of mankind). However, under adverse conditions messages or packets with lower priority as identified by IP Options header through tagging or traffic classification, or type of service may be filtered out or dropped. Only high priority messages or packets may be forwarded to the mobile operator's core network or the coordinating server to further forward to the core network. A algorithm should also require minimal CPU resources while doing the same.

In Linux, the traffic shaping algorithms are called just before the traffic is offered to the driver/interface to be sent on the wire.

Qdiscs may be used for shaping, in some embodiments. Queuing disciplines (Qdiscs) are schedulers associated with an interface. In a classful qdisc, the traffic is then sent to various classes which then apply the rate, latency criteria to the traffic, before sending it again to classless qdiscs which hold the actual packets. What traffic belongs to what class is determined with the help of filters, or with the help of iptables.

One thing to be aware of while using shaping mechanisms is that (in the absence of any other mechanism) the best shaping algorithms cannot do anything for you if you overestimate the available pipe by a large margin. In case of underestimation things are fine all the desired traffic offered to the pipe can be handled by it. On the other hand, if there are no other criteria like DSCP markings, the extra traffic offered to the interface would be dropped. What traffic would get dropped would be non-deterministic. Estimation can be performed using packet drops at the mesh gateway node to mitigate this concern.

Traffic shaping may be based on characterizing past, current or future transport and usage, for e.g. LTE or 3G Data versus Infrastructure traffic. It may also be possible to shape data traffic for each transport for example LTE, 3G, etc. independently, so that all infrastructure traffic goes through and 3G voice goes through but LTE data is bandwidth-limited, for example. It may be possible to shape data traffic for each mesh node independently, for example to enable each mesh node to have a certain set number of voice calls that they will be able to make even if other mesh nodes are denied data bandwidth. Additional categories or transport or other criteria may be considered in traffic shaping algorithms. For example, though VoLTE traffic is of Data category, it may be accorded QCI value 1. Similarly, certain access categories/classes like emergency bearer may be assigned QCI value of 10, 12, and 14 for special handling. DSCP values for the user-traffic may be preserved.

Traffic shaping may require reserving a certain bandwidth for high priority traffic such as infrastructure traffic etc. Likewise, signaling traffic may get a separate bandwidth or a different QCI map in the case of LTE backhaul. It may also be possible to limit signaling traffic from single transport so that it does not take down all the other in case of adverse network conditions or scenarios like LTE paging flood.

Proper Differential Services Code Point (DSCP) or Type of Service (TOS) marking may be assigned by the gateway network node (mesh gateway node) for each message based on message type or traffic classification field of the IP Options header as assigned by the source mesh network node during traffic prioritization. Different radio access technology uses different mechanism in identification and classification of the message. As an example, a Traffic Filter Template (TFT) may be used to translate the TOS marking to an appropriate QCI value, in some embodiments. In some embodiments the TFT may be performed at a mesh gateway node LTE interconnect.

Traffic Policing

Traffic policing is what can be done on the ingress interface. In general traffic can be dropped. In all cases where the source of the traffic could be shaped, that would be a better option. This is useful to protect the system for DoS attacks.

Traffic Shaping

An important distinction needs to be made between shaping and classification with regards to the scope. The scope of traffic shaping is an interface, it does not help with end-to-end traffic. Shaping can take classification as an input for the decisions.

Traffic classification, on the other hand, does not do anything at the interface level unless it is coupled with a shaping mechanism (implicit or explicit). The purpose of classification is to mark the traffic in order to aid the network elements in the path with their handling decision for the packets. The network elements can even ignore the suggestion in the absence of an agreement. In case of different carrier/transport types mappings need to be defined for these markings to be carried in the network.

In the Wi-Fi domain, these are defined as 4 different access categories in the WMM/802.11e specs. In the Ethernet domain DSCP/TOS markings are used. In LTE QCI is the terminology used for the same.

In general, in a network we might end up with 3 different QCI values:

QCI 6: Signaling
QCI 7: Voice
QCI 8: Data

This implies that 3 separate DSCP to QCI mappings can be done. Different QCI values may be assigned for IP Multimedia Subsystem (IMS) signaling, VoLTE traffic or like of it for special handling.

FIGURES

FIG. 1 is a network diagram in accordance with some embodiments.

In some embodiments, as shown in FIG. 1, a mesh node 1 101, a mesh node 2 102, and a mesh node 3 103 are multi-radio access technology (multi-RAT) base stations. Base stations 101, 102, and 103 form a mesh network establishing mesh network links 106, 107, 108, 109, and 110 with a base station 104. The mesh network links are flexible and are used by the mesh nodes to route traffic around congestion within the mesh network as needed. The base station 104 acts as gateway node or mesh gateway node, and provides backhaul connectivity to a core network to the base stations 101, 102, and 103 over backhaul link 114 to a coordinating server(s) 105 and towards core network 115. The Base stations 101, 102, 103, 104 may also provide eNodeB, NodeB, Wi-Fi Access Point, Femto Base Station etc. functionality, and may support radio access technologies such as 2G, 3G, 4G, 5G, Wi-Fi etc. The base stations 101, 102, 103 may also be known as mesh network nodes 101, 102, 103.

The coordinating servers 105 are shown as two coordinating servers 105a and 105b. The coordinating servers 105a and 105b may be in load-sharing mode or may be in active-standby mode for high availability. The coordinating servers 105 may be located between a radio access network (RAN) and the core network and may appear as core network to the base stations in a radio access network (RAN) and a single eNodeB to the core network, i.e., may provide virtualization of the base stations towards the core network as described in, e.g., U.S. Pat. No. 9,491,801, hereby incorporated by reference in its entirety. As shown in FIG. 1, various user equipments 111a, 111b, 111c are connected to the base station 101. The base station 101 provides backhaul connectivity to the user equipments 111a, 111b, and 111c connected to it over mesh network links 106, 107, 108, 109, 110 and 114. The user equipments may be mobile devices, mobile phones, personal digital assistant (PDA), tablet, laptop etc. The base station 102 provides backhaul connection to user equipments 112a, 112b, 112c and the base station 103 provides backhaul connection to user equipments 113a, 113b, and 113c. The user equipments 111a, 111b, 111c, 112a, 112b, 112c, 113a, 113b, 113c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 111a, 111b, 111c, 112a, 112b, 112c, 113a, 113b, and 113c, the uplink 114 may get congested under certain circumstances. As described above, to continue the radio access network running and providing services to the user equipments, the solution requires prioritizing or classifying the traffic based at the base stations 101, 102, 103. The traffic from the base stations 101, 102, and 103 to the core network 115 through the coordinating server 105 flows through an IPSec tunnel terminated at the coordinating server 105. The mesh network nodes 101, 102, and 103 adds IP Option header field to the outermost IP Header (i.e., not to the pre-encapsulated packets). The traffic may from the base station 101 may follow any of the mesh network link path such as 107, 106-110, 106-108-109 to reach to the mesh gateway node 104, according to a mesh network routing protocol; an example protocol is found in U.S. Pat. App. Pub. No. US20160308755A1, hereby incorporated by reference in its entirety. In the case that traffic from the base station 101 flows through mesh network 102 in the case the path selected is 106-110 to reach to the mesh gateway node 104, the mesh network node 102 may not remove the IP Options header added by the base station 101 in the outer most IP Header. In an alternate embodiment, the base station 102 may update the IP Options header field with a different value of traffic classification.

In some embodiments, the mesh gateway node 104 receives the message with IP Options header described above, and may parse the IP Options header to extract a traffic classification value. The mesh gateway node 104 may map the traffic classification, as extracted from the fourth octet of the IP Options header, to a proper DSCP value to encode in messages or packets towards the coordinating server. The mesh gateway node 104 may alternately or in conjunction map the traffic classification to a proper QCI value, if the uplink is through an LTE modem backhaul uplink to a macro eNodeB through another operator core network. The mesh gateway node 104 receives the instructions on how to map the traffic classification to the DSCP/QCI as a configuration or a template from the coordinating server 105.

In some embodiments, as well as applying DSCP and/or QCI values, and depending on the congestion as calculated by the mesh gateway node 104 based on performance measurements, statistics, internal and external KPIs, and measurement of bandwidth available at the mesh gateway node 104, the mesh gateway nodes may put the packets in a different priority message queue. The mesh gateway node 104 may also adjust the available mesh link bandwidth or uplink bandwidth assigned to mesh nodes 101, 102, 103 based on the congestion level and traffic load for varying priority level identified from the traffic classification field of the IP Options header. In some embodiments, these steps may be performed not at the mesh gateway node but at the coordinating servers 105.

Message queues as described herein generally refer to buffers in packet routing software such as iptables for enabling packets to be sent out; iptables, pf, etc. are able to switch between sending packets from multiple queues at a different rate per queue to achieve a desired traffic prioritization breakdown. In some cases these rates are represented as a percentage of the maximum bandwidth or line rate.

Figure 2:
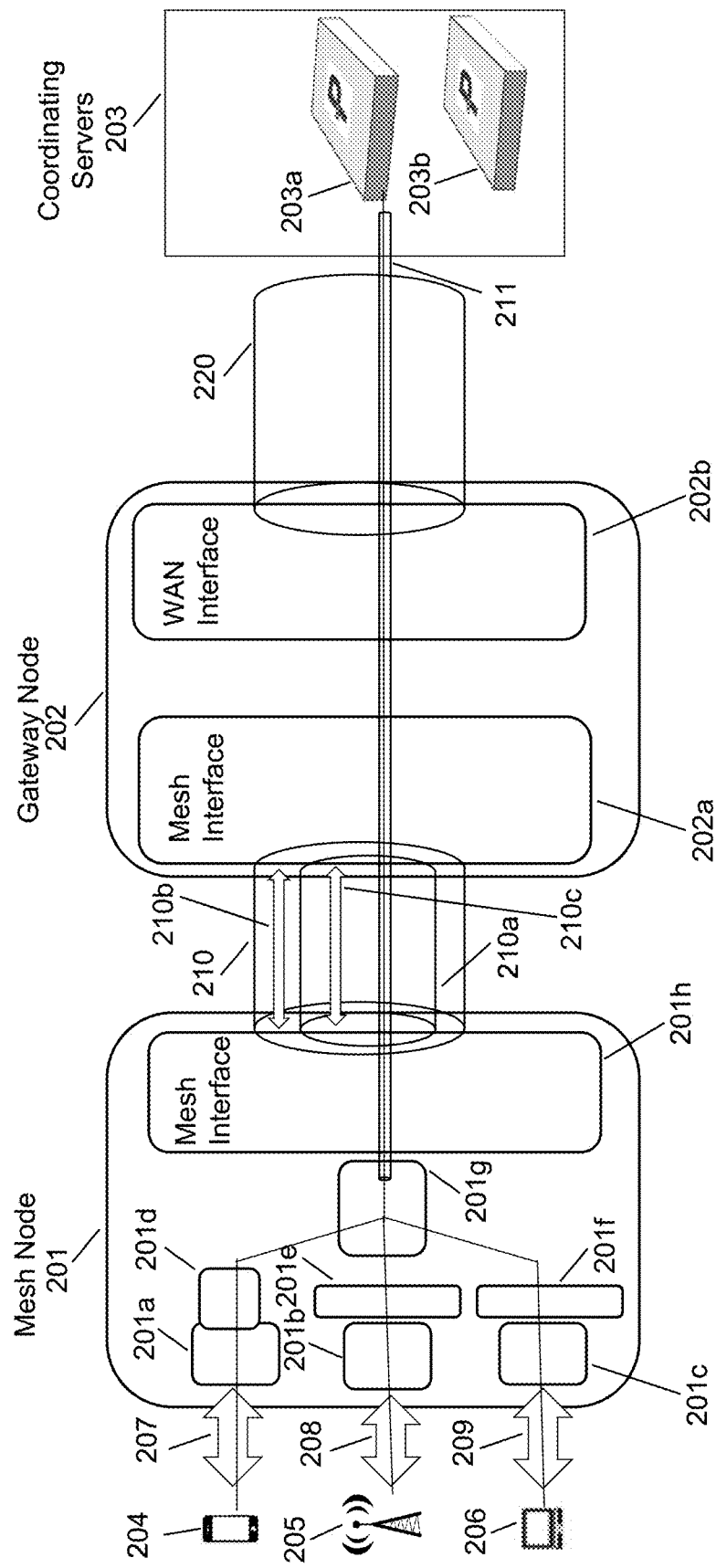
FIG. 2 is a schematic network diagram showing communication between various elements of a radio access network in accordance with some embodiments.

FIG. 2 is a schematic network diagram showing communication between various elements of a radio access network in accordance with some embodiments.

In some embodiments, a multi-RAT base station 201 that may be base station 101 or 102 or 103 has a mesh link 210 to a base station 202 or base station 104 from FIG. 1. The base station 202 is a mesh gateway node and provides backhaul connectivity to the mesh network node 201 via uplink 220 to a coordinating server. The coordinating servers 203 is also referred to as the coordinating servers 105 in this disclosure. As shown in FIG. 1 various user equipments are connected to the base station and the base station provides connectivity to the core network, an LTE UE or 4G UE 204 connects to the base station 201 over air interface 207 at LTE module 201a. The LTE module 201a provides SCTP and GTP connection support on the access side to 4G UE 204. A 3G Femto Base Station 205 may also be connected to base station 201 as the base station 201 may be providing Ethernet based wired connectivity 208 to user equipments camped on to the 3G Femto Base Station 205 at LAN interface 201b of the base station 201. Similarly, Wi-Fi UE 206 may be connected over an Wi-Fi interface 209 at virtual access point (VAP) module 201c of the base station 201. User traffic and other messages including signaling, performance, measurement etc. from 4G UE 204, 3G Femto Base Station 205, and Wi-Fi UE 206 may further be routed to a mesh interface module 201h via an internal IP interface 201d and bridges 201e and 201f to a virtual IP interface 201g.

The virtual IP interface 201g establishes IPsec tunnel 211 from the mesh network node 201 to the coordinating server 203 to provide encrypted backhaul toward the core network. The packets from UEs 204, 205 and 206 thus flows through IPSec tunnel 211 from the base station 201 to the gateway node 202 to the coordinating server 203. The messages flowing through IPSec tunnel 211 are further encapsulated into an 802.11 Data layer frames or packets 210a. The 802.11 Data layer frame carries information about meshing protocol 210c. Another reason IPSec tunnel traffic is encapsulated into the 802.11 Data layer as the IPSec traffic flowing through the IPSec tunnel is not purely IP traffic. 802.11

Control and Management frames 210b assist with the delivery of data frames by establishing and maintaining connection between the mesh node 201 and the gateway node 202.

The mesh link 210 is between the base station 201 and the gateway node 202. Traffic or messages over the mesh link 210 are received at the mesh gateway node 202 at mesh interface 202a. The mesh gateway node 202 extracts the traffic classification field from the outermost IP Header's IP Options header. The mesh gateway node 202 and its Wide Area Network (WAN) interface 202b further maps traffic classification value from the received message at mesh interface 202a into appropriate DSCP or QCI based on the configuration or profiles information received from the coordinating servers 203. After mapping to appropriate DSCP or QCI, the mesh gateway node 202 sends the traffic over uplink 220 to the coordinating server 203. The mesh gateway node 202, in an alternate embodiment, may also send the traffic to macro eNodeB instead of the coordinating server 203. If the mesh gateway node is not an edge node but connected to another mesh gateway node in a daisy chain, then the gateway node 202 may not remove the IP Options header before sending it over uplink 220. In another embodiment, the mesh gateway node 202 may not remove the IP Options header even though it is an edge node and connected to the coordinating server 203 so that the traffic shaping may be performed at the coordinating servers 203.

Figure 3:
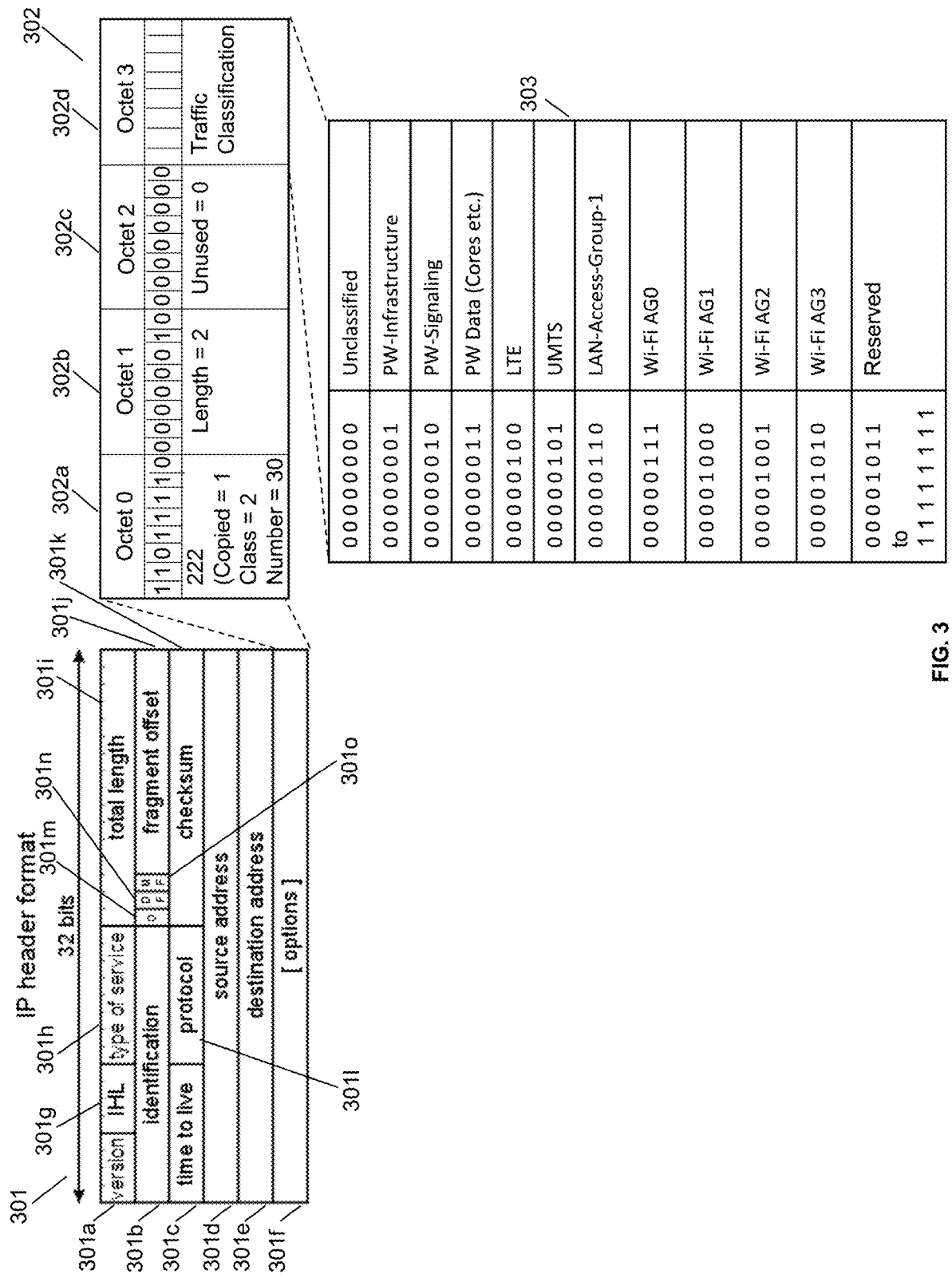
FIG. 3 is a message format structure in accordance with some embodiments.

FIG. 3 shows a message format structure in accordance with some embodiments. IP header format 301 is shown for IPv4. IPv4 header 301 includes options field 302 shown as blown up. There may be more than one options field. IP Options field 302 is defined to perform traffic prioritization and traffic classification. IP Options field 302 is 4 bytes long to avoid any need of padding. The first octet or first byte 302a of IP Options 302 is coded as 222. The first octet 302a is divided into three sub-fields namely copied, option class, and option number. The copied flag, bit 7 or the most significant bit of octet 1 if set to 1 indicates the option is intended to be copied into all fragments when a datagram is fragmented. The option class specifies one of four general categories into which the option belongs. Option class is set to 2 in the IP Options header field. Option class is represented by bit 6 and 5 of the first octet. Option number that is the remaining five bits, bits 4 through 0, of the first octet is set to 30. Thus, the value of octet 1 is set to 0xDE (or 222 in decimal).

Second octet 302b of the IP Option header 302 represents length of the IP Options header 302 and set to 2.

Third octet 302c of the IP Option header 302 is unused and hence may be set to 0.

Fourth octet 302d of the IP Option header represents traffic classification. The mesh network node 101, 102, 103, or 201 may set this octet to any value 303 based on traffic or DSCP/TOS in the message as identified and as described below.

Unclassified: 0
PW Infrastructure: 1
PW Signaling: 2
PW Data (cores etc.): 3
Long Term Evolution (LTE): 4
Universal Mobile Telecommunication System (UMTS)/3G: 5
LAN Access Group 1: 6
Wi-Fi Access Group (AG) 0: 7
Wi-Fi AG 1: 8
Wi-Fi AG 2: 9
Wi-Fi AG 3: 10

Reserved: 11 through 255 (may be used for other types of traffic)

In addition, the other identified fields IP version 301a, identification 301b, time to live 301c, source address 301d, destination address 301e, options 301f (which contains the field 302), IHL 301g, type of service 301h, total packet length 301i, fragment offset 301j, checksum 301k, protocol 3011, 301m, 301n and 3010 represents fields of IPv4 header as identified in RFC 791. RFC 791 is hereby incorporated by reference in its entirety for all purposes. Field 301h is the type of service (ToS) field and is used for DSCP, in conjunction with the IP Options field whose use is described herein.

While the IP Options header is discussed here in detail for IPv4, person skilled in the art can apply the solution disclosed here to IPv6 as well. RFC 8200 is hereby incorporated by reference in its entirety for all purposes.

Figure 4:
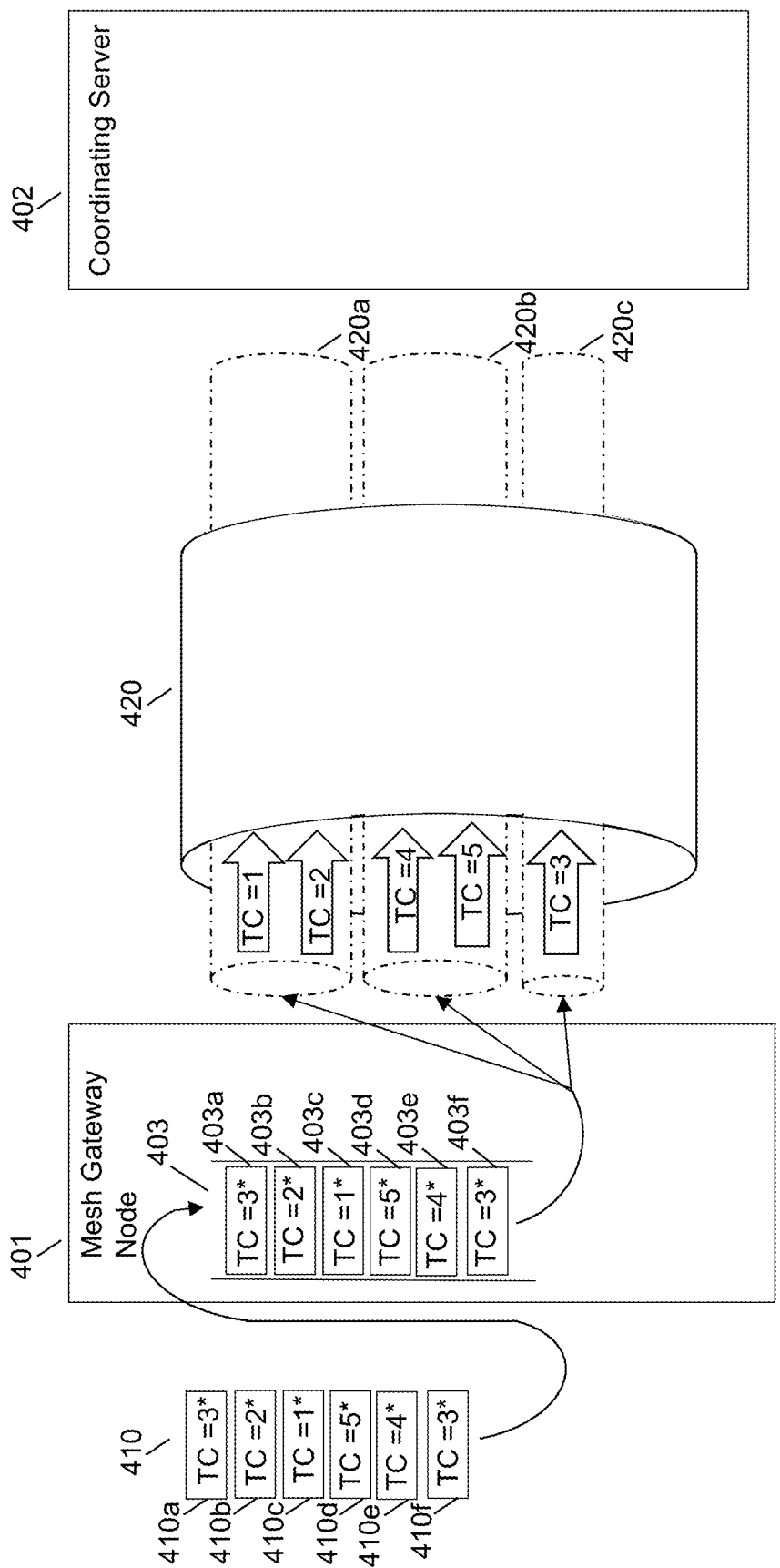
FIG. 4 is a schematic network architecture in accordance with some embodiments.

FIG. 4 is a schematic network architecture diagram in accordance with some embodiments and shows the uplink 420 between a mesh gateway node 401 and a coordinating server 402. The mesh gateway node 401 is identified as the mesh gateway node 202 and 104 as well in this disclosure. As mentioned before, the mesh gateway node 401 performs traffic shaping by putting the message into different priority message queues 420a, 420b, and 420c based on the traffic classification value in the IP Options header field. Additionally, the mesh gateway node 401 may assign a different bandwidth to the messaging queues 420a, 420b, and 420c such that all messages with traffic classification (TC) 1 and 2 are placed in a message queue 420a that has been assigned a certain bandwidth i.e. has a limited forwarding throughput compared to the total available bandwidth 420. Likewise, all messages with traffic classification 4 and 5 are placed in a message queue 420b that has been assigned a limited forwarding throughput (bandwidth) compared to the of the total available bandwidth 420. Likewise, messages with traffic classification 3 are placed in a message queue 420c having a limited bandwidth compared to the total available bandwidth 420.

As shown graphically, the person skilled in the art can infer that different bandwidth are assigned to carry traffic or messages with different traffic classification value. As mentioned before, the mesh gateway node 401 may leave the IP Options header on the received packets while mapping the traffic classification to DSCP or QCI if traffic shaping may be performed at another mesh gateway node (not shown in the figure) or the coordinating server 402.

As used herein, the queues 420a, 420b, 420c may be LTE data bearers or GTP tunnels. Alternately, and also consistent with their use throughout the present disclosure, in another embodiment the queues may simply represent logical queues existing at the mesh gateway node that are not present on the backhaul link 420, such that all the packets are being placed on the network link in a single stream, but limited in number so as to control the total bandwidth (this is shown by the use of dotted lines). In another embodiment the queues may be logical queues enforced using ToS, QCI, or another means.

Shown in FIG. 4 are messages 403a, 403b, 403c, 403d, 403e, and 403f in a queue 403 with different traffic classification 303 (TC=3. TC=1, TC=2, TC=4, and TC=5) set in IP Options header 302. Messages 403a, 403b, 403c, 403d, 403e, and 403f are received at the mesh gateway node 401 from, e.g., mesh network node 201 or a plurality of other mesh network nodes, as shown by 410. Messages 410a, 410b, 410c, 410d, 410e, and 410f are messages with traffic classification done at mesh network node 201.

Messages marked with an asterisk (*) are messages that have been assigned an IP Options header in accordance with some embodiments. The removal of the header is shown as being performed at mesh gateway node 401 before egress into the queues 420a, 420b, 420c.

The mesh gateway node 401 under adverse conditions such as congestion over the link, may perform filtering of the messages by dropping low priority messages or packets and not placing them in message queues to forward the messages toward a mobile operator's core network or the coordinating server. The mesh gateway node may thereby control or filter the message or packet flow based on the IP Options header and traffic type as identified by DSCP and/or type of service (ToS).

Figure 5:
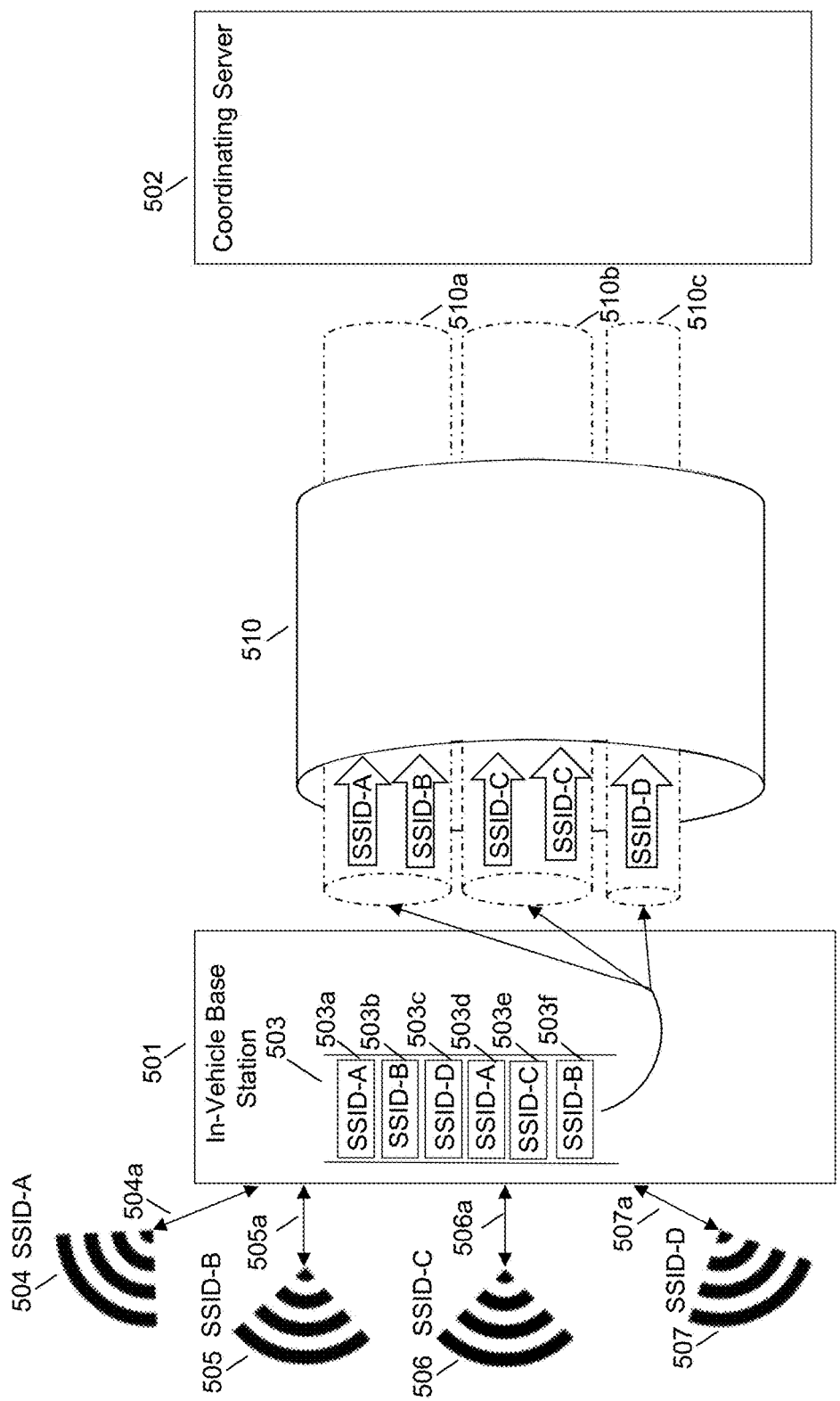
FIG. 5 is a second schematic network architecture in accordance with some embodiments.

FIG. 5 is a schematic network architecture diagram in accordance with some embodiments and shows the uplink 510 between an in-vehicle base station 501 and a coordinating server 502. The in-vehicle base station 501 may be a 3G femto base station, eNodeB, NodeB, HeNB, Wi-Fi base station, a multi-RAT base station supporting 2G, 3G, 4G, LTE, 5G, LTE-Advanced, WiMAX, etc. The in-vehicle base station 501 may act as a mesh network node or may act as a mesh gateway node. The in-vehicle base station 501 as shown is a mesh gateway node. The in-vehicle base station 501 broadcasts multiple service set identifiers (SSIDs) SSID-A 504, SSID-B 505, SSID-C 506, and SSID-507. The in-vehicle base station 501 receives traffic from various user equipments (not shown in the figure) connected to the in-vehicle base station 501 through different SSIDs 504, 505, 506, and 507 over wi-fi or air interfaces 504a, 505a, 506a, and 507a. The in-vehicle base station 501 may shape the incoming traffic by placing them in a different priority and different bandwidth queues. As shown in the FIG. 5, messages 503a, 503b, 503c, 503d, 503e, and 503f in a processing queue 503 at the in-vehicle base station may be placed in messaging queues 510a, 510b, and 510c each having certain bandwidth of total bandwidth of the uplink 510 and a different priority.

In some embodiments, the in-vehicle base station may add IP Options header to a packet before placing the packet/message in a queue to send over uplink 510. The IP Options header carries information that helps a base station in a mesh network to identify priority and place the message in an appropriate bandwidth and priority queue to send to another base station in the mesh network or to a gateway node of the mesh network. In the example shown in FIG. 5, traffic classification and traffic shaping tasks are performed at the in-vehicle base station 501 and hence there is no requirement to send traffic shaping information to another node in the network; therefore no IP Options header need to be added.

In another alternate embodiment, in-vehicle nodes may act as a gateway network node. Traffic from multiple virtual access points (VAPs) would map to the same access categories and DSCP markings. However, Wi-Fi may need to have more of the bandwidth available to it when required. Traffic from different SSID may be prioritized differently and may be placed in a different bandwidth pipe having different priority queues.

Figure 6:
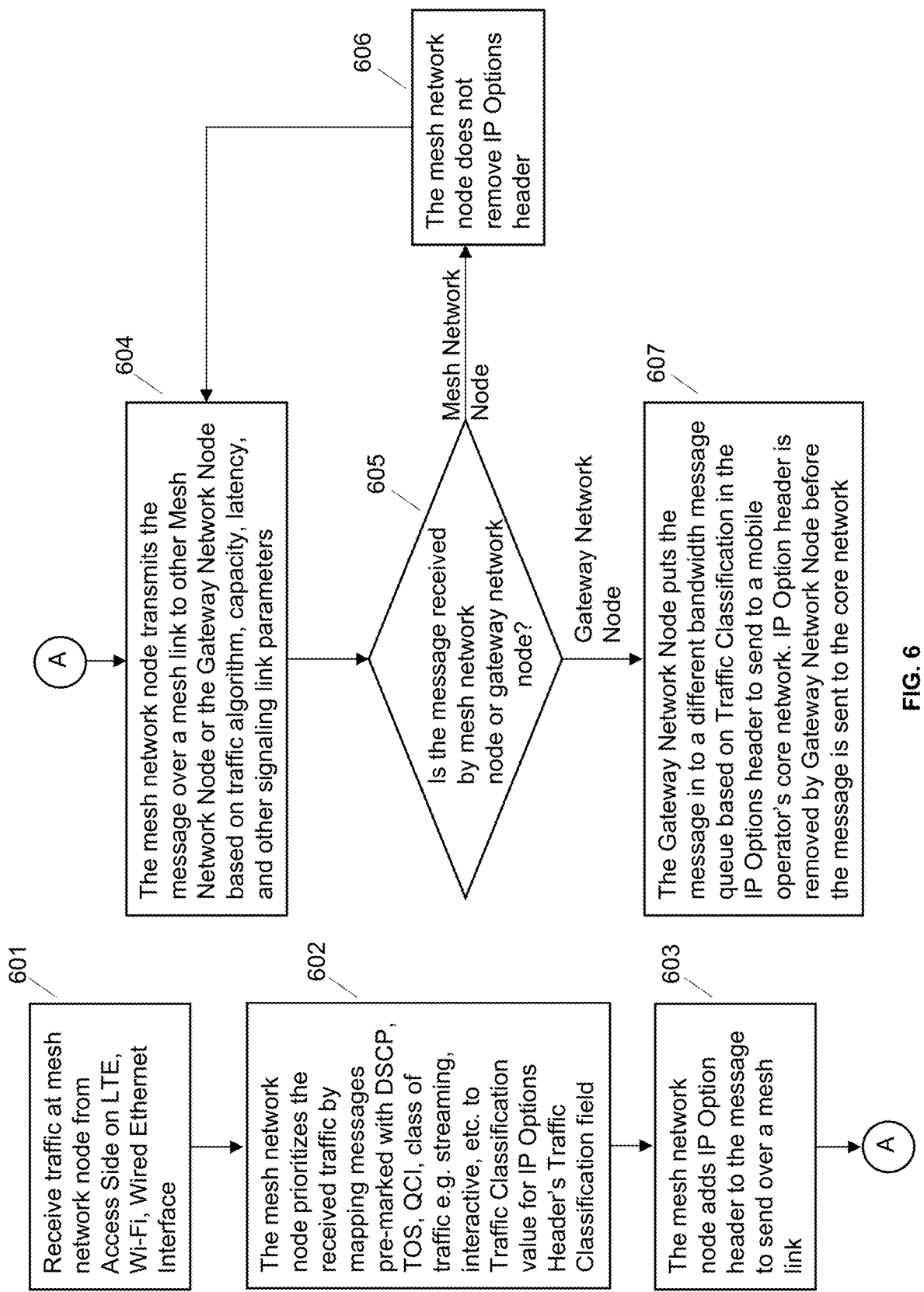
FIG. 6 is a flowchart in accordance with some embodiments.

FIG. 6 is a flow chart in accordance with some embodiments. At step 601, the mesh network node 101, 102, or 103 may receive traffic from access side on LTE interface 207, Wired Ethernet interface 208, or Wi-Fi interfaces 209 from various user equipments 111a, 111b, 111c, 112a. 112b. 112c, 113a, 113b, and 113c etc. At step 602, the mesh network nodes or the base stations 101, 102, or 103 may assign traffic classification value of the IP Options header based on the DSCP, Type of Service (TOS), or QCI value pre-marked or assigned in the incoming messages. The base station in an alternate embodiment assign traffic classification value based on class of traffic such as interactive traffic, voice traffic, data traffic, web application traffic, etc.

At step 603, the base stations 101, 103, or 103 may add the IP Options header to the outermost IP header of the message that carries encapsulated IPSec tunnel traffic. At step 604, the base stations after updating the outermost IP header sends the message over mesh link to the core network. The sent message may reach directly to the mesh gateway node 104 or may reach the mesh gateway node via mesh network links through other intermediary mesh network nodes. If the message, for example sent by mesh network node 101 reaches mesh network node 102, as shown in step 605, the mesh network node 102, as shown in step 606, does not remove the IP Options header. The mesh network node 102 sends the message over mesh network link towards core network as shown in step 604.

However, at step 605, if the message is received at the mesh gateway node such as base station 104, as shown in step 607, the mesh gateway node 104 extracts the traffic classification value from the IP Options header field and puts the message into a message queue having an appropriate bandwidth associated with traffic classification. As shown in step 607, the mesh gateway node may remove IP Options header before sending the message to the coordinating server or core network. At step 607, the mesh gateway node may set an appropriate DSCP value in a message towards coordinating server based on traffic classification. In an alternate embodiment, at step 607, the mesh gateway node may map traffic classification into appropriate QCI if the mesh gateway node provides backhaul access through macro base station.

Figure 7A:
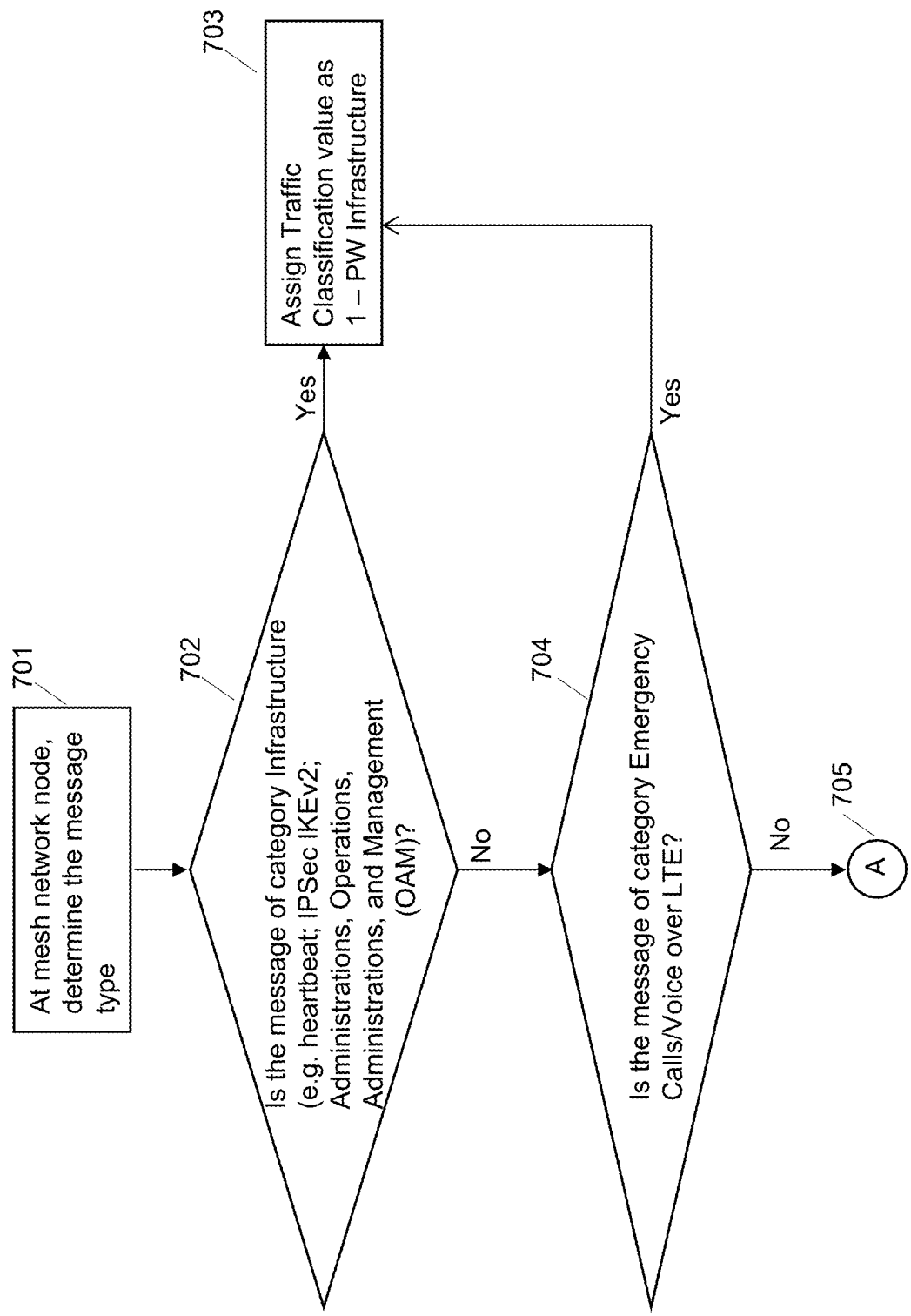
FIGS. 7A, 7B, and 7C are flowcharts in accordance with some embodiments.
Figure 7B:
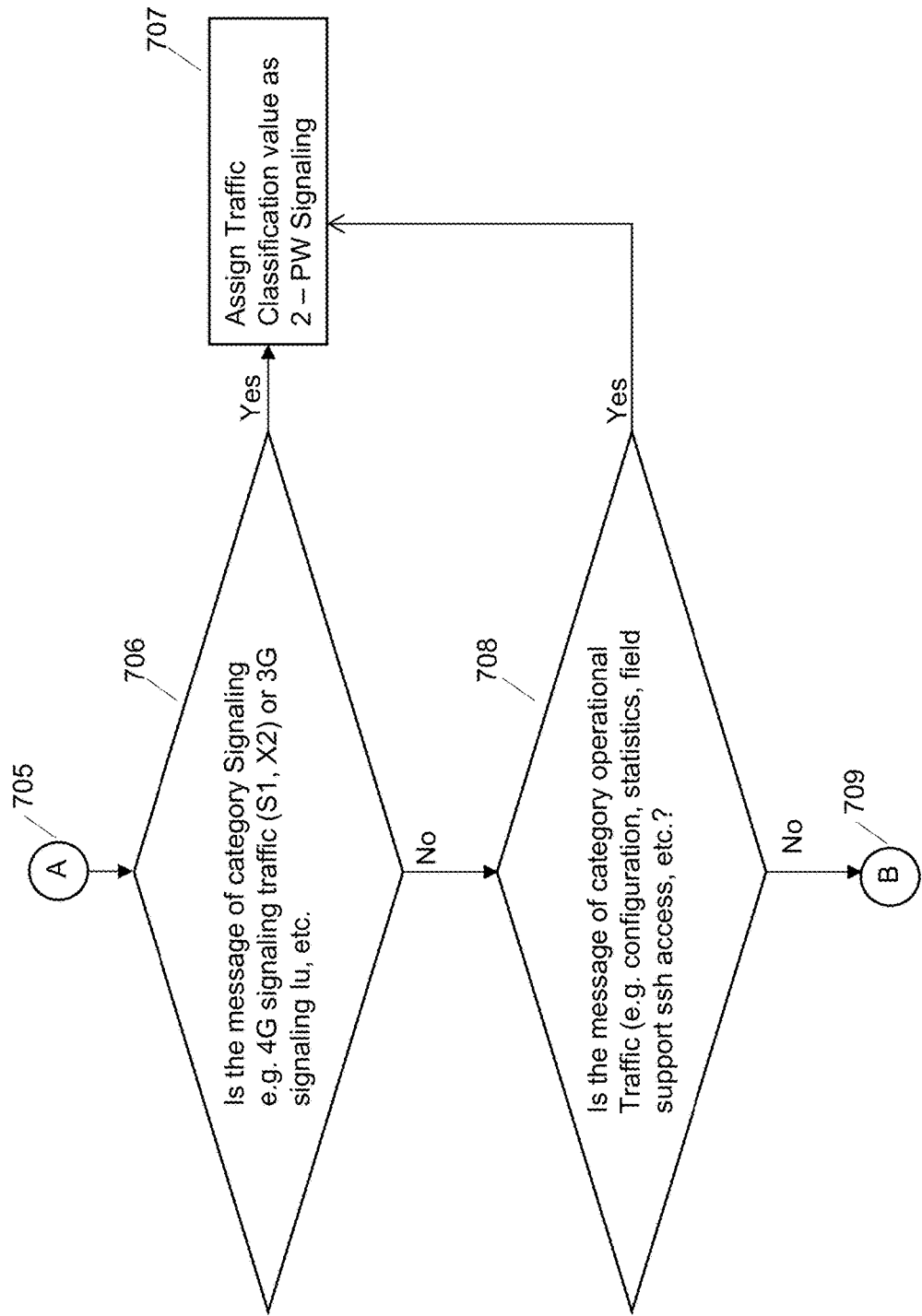
Figure 7C:
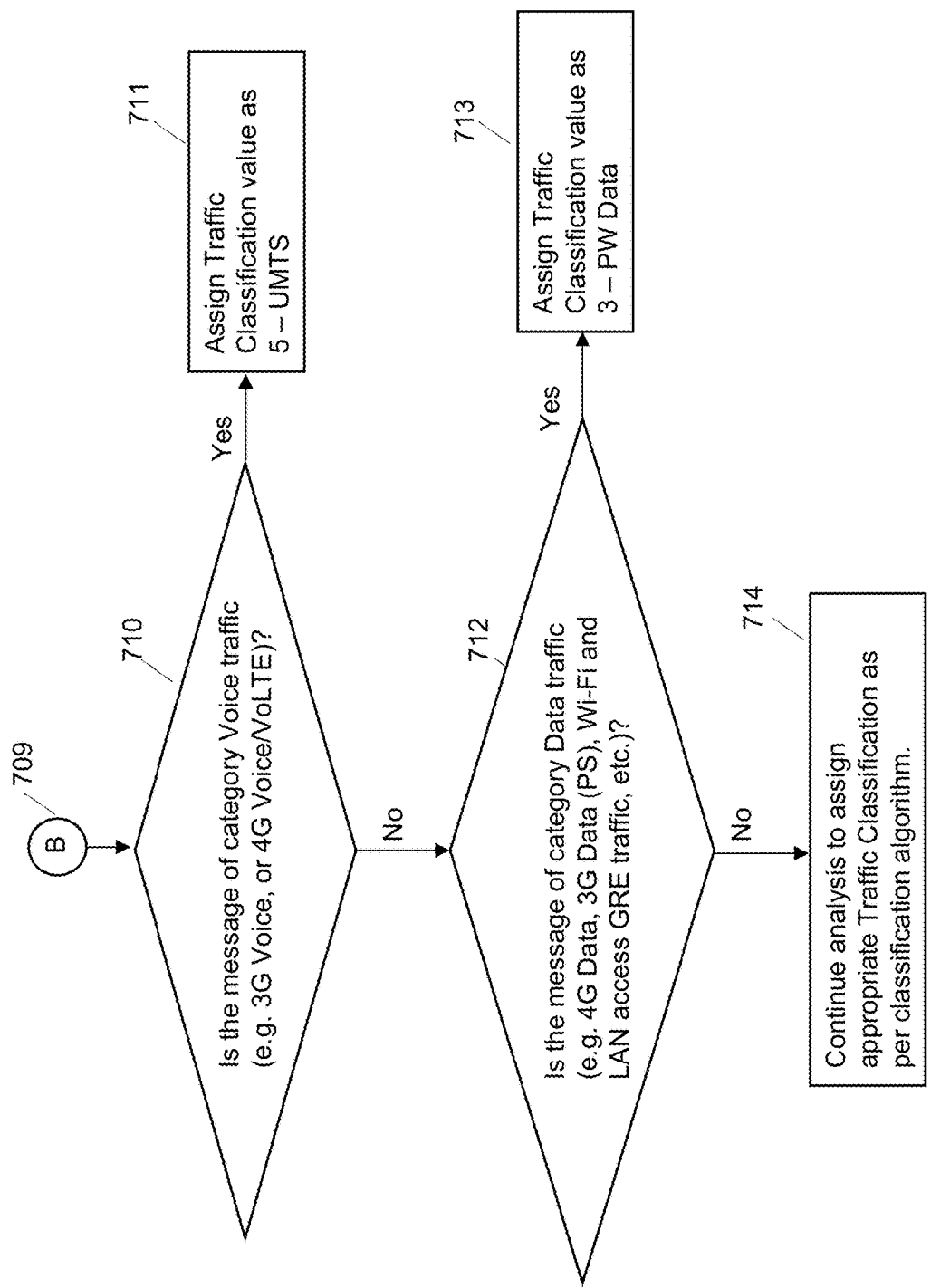

FIGS. 7A, 7B, and 7C are flow charts in accordance with some embodiments showing traffic classification. As shown at step 701, traffic classification occurs at mesh network node e.g. base stations 101, 102, or 103. At step 702, message type is determined. If the message is related to infrastructure e.g. heartbeat at different protocol layers such as SCTP, IPSec, Configuration Manager (ConfigMgr) between base station and coordinating server; ICMP traffic at WAN interface at mesh gateway node, babel packets from one base station to another base station; or GTP heartbeat etc., the traffic classification may be set to type PW-Infrastructure as shown at step 703. PW-Infrastructure may be assigned a value of 1 as described above. If the message is of type operations administration and management (OAM) e.g. network performance KPIs, statistics, administrative and operational commands, mesh interface stats, call drop related KPIs, network interface stats, SON power control commands, signal to interference noise ratio (SINR), administrative command for cell management, then the traffic classification may be set to PW-Infrastructure as shown in step 703. At step 704, the message type is compared against emergency call or voice over LTE, and traffic classification may be set to PW-Infrastructure to provide highest priority to emergency calls like infrastructure traffic.

Analysis of the message for correct prioritization continues as shown at step 705. At step 706, if the message is S1 or X2 signaling message or Iu signaling message for 4G or 3G, traffic classification value may be set to PW-Signaling as shown at step 707. PW-Signaling may be assigned a value of 2 as described above. In addition, as shown at step 708, messages of operational traffic e.g. configuration, statistics, secure shell (ssh) access for field support etc. may also be assigned traffic classification value of PW-Signaling.

Analysis of the message for correct prioritization continues as shown at step 709. If the message is of type 3G voice or 4G voice or voice over LTE as determined at step 710, the traffic classification may be set to UMTS with value set to 5 as shown at step 711. At step 712, continuing traffic classification, for message of type data traffic e.g. 4G data, 3G data over packet switching or circuit switching, Wi-Fi and LAN access, GRE traffic etc., traffic classification may be set to 3 for PW-Data as shown in step 713. Traffic classification process continues in accordance with different traffic classification values in use at the given mesh network node.

Figure 8:
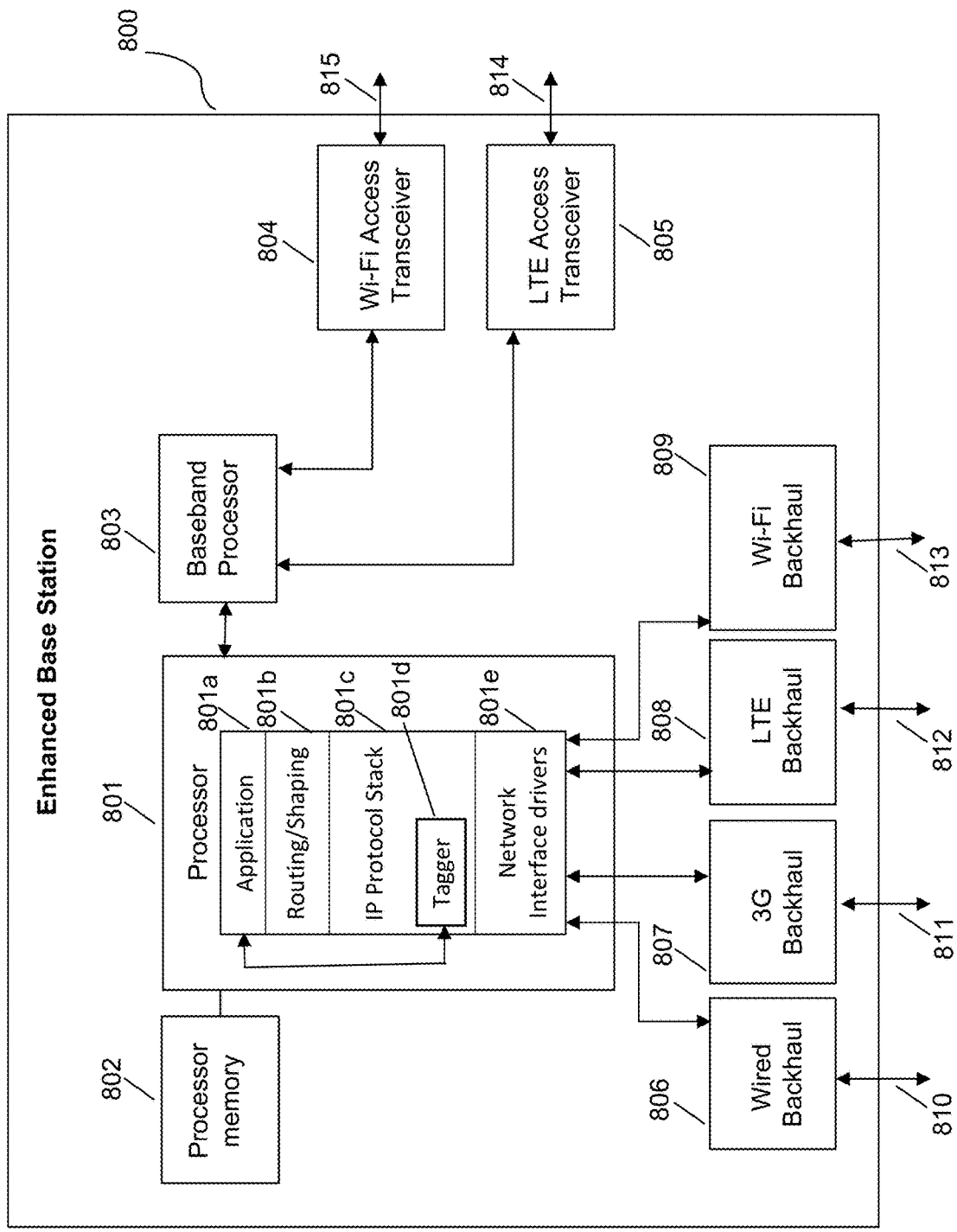
FIG. 8 is a schematic architecture diagram of an exemplary base station, in accordance with some embodiments.

FIG. 8 is a schematic diagram of an enhanced eNodeB, in accordance with some embodiments. Enhanced eNodeB 800 may include processor 801, processor memory 802 in communication with the processor, baseband processor 803. Enhanced eNodeB 800 may also include Wi-Fi access transceiver 804 with access side interface 815, and LTE access transceiver 805 with access side interface 814 and thereby connecting to user equipments (not shown in the figure). Enhanced eNodeB 800 may also include wired backhaul 806 with wired backhaul interface 810, 3G backhaul 807 with 3G backhaul interface 811, LTE backhaul 808 with LTE backhaul interface 812, and Wi-Fi backhaul 809 with Wi-Fi backhaul interface 813. Enhanced eNodeB provides backhaul connectivity via backhaul interfaces 810, 811, 812, and 813 to user equipments connected to the enhanced eNodeB via access interfaces 814 and 815. As shown in the FIG. 8, LTE access transceiver 805 and Wi-Fi access transceiver are further in communication with baseband processor 803 that is also in communication with processor 801.

Processor 801 and baseband processor 803 are in communication with one another. Processor 801 may perform routing functions, and may determine if/when a switch in network configuration is needed. Baseband processor 803 may generate and receive radio signals for both wi-fi access transceiver 804 and LTE access transceiver 805, based on instructions from processor 801. In some embodiments, processors 801 and baseband processor 803 may be on the same physical logic board. In other embodiments, they may be on separate logic boards.

The LTE access transceiver 805 may be a radio transceiver capable of providing LTE eNodeB functionality, and may be capable of higher power and multi-channel OFDMA. The LTE backhaul 808 may be a radio transceiver capable of providing LTE UE functionality. Both 805 and 808 are capable of receiving and transmitting on one or more LTE bands. In some embodiments, either or both of transceivers 805 and 808 may be capable of providing both LTE eNodeB and LTE UE functionality. Transceivers 805 and 808 may be coupled to processor 801 via baseband processor 803. In addition, wired backhaul 806 coupled to processor 801 may provide backhaul connectivity to other 3G femto base station via wired Ethernet interface 810. 3G backhaul 807 coupled to processor may provide 3G wireless backhaul connectivity.

Wired backhaul 806, or wireless backhaul 809, or any combination of backhaul, may be used. Wired backhaul 806 may be an Ethernet-based backhaul (including Gigabit Ethernet), or a fiber-optic backhaul connection, or a cable-based backhaul connection, in some embodiments. Additionally, wireless backhaul 809 may be provided in addition to 3G backhaul 807 and LTE backhaul 808, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 802 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 801 may identify the appropriate network configuration and may perform execute instructions stored in processor memory 802 for application layer processing 801*a*, routing and shaping 801*b* of packets from one network interface to another accordingly. Processor 801 may use memory 802, in particular to store a routing table to be used for routing packets. Baseband processor 803 may perform operations to generate the radio frequency signals for transmission or retransmission by transceivers such as 804, 805, 807, 808, 809. Baseband processor 803 may also perform operations to decode signals received by transceivers 804, 805, 807, 808, 809. Baseband processor 806 may use memory 802 to perform these tasks. Further, processor 801 may perform tagging at tagger 801*d* that may be part of IP protocol functionality 801*c* in communication with application layer 801*a*. Network interface drivers 801*e* may send and receive messages over backhaul interfaces 810, 811, 812, 813 via 806, 807, 808, 809 respectively.

In operation, packets may be received from access transceivers 804, 805 and may be processed by processor 801 to determine what type of tagging is required. The packets may be tagged by tagger 801*d* in conjunction with program logic in application 801*a*, which identifies the type of traffic. Prioritization is performed at routing/shaping layer 801*b*, which issues instructions to IP protocol stack 801*c* to enqueue packets for the backhaul link(s), and the queued packets are sent out via network interface driver 801*e* to backhaul interfaces 806, 807, 808, 809.

Figure 9:
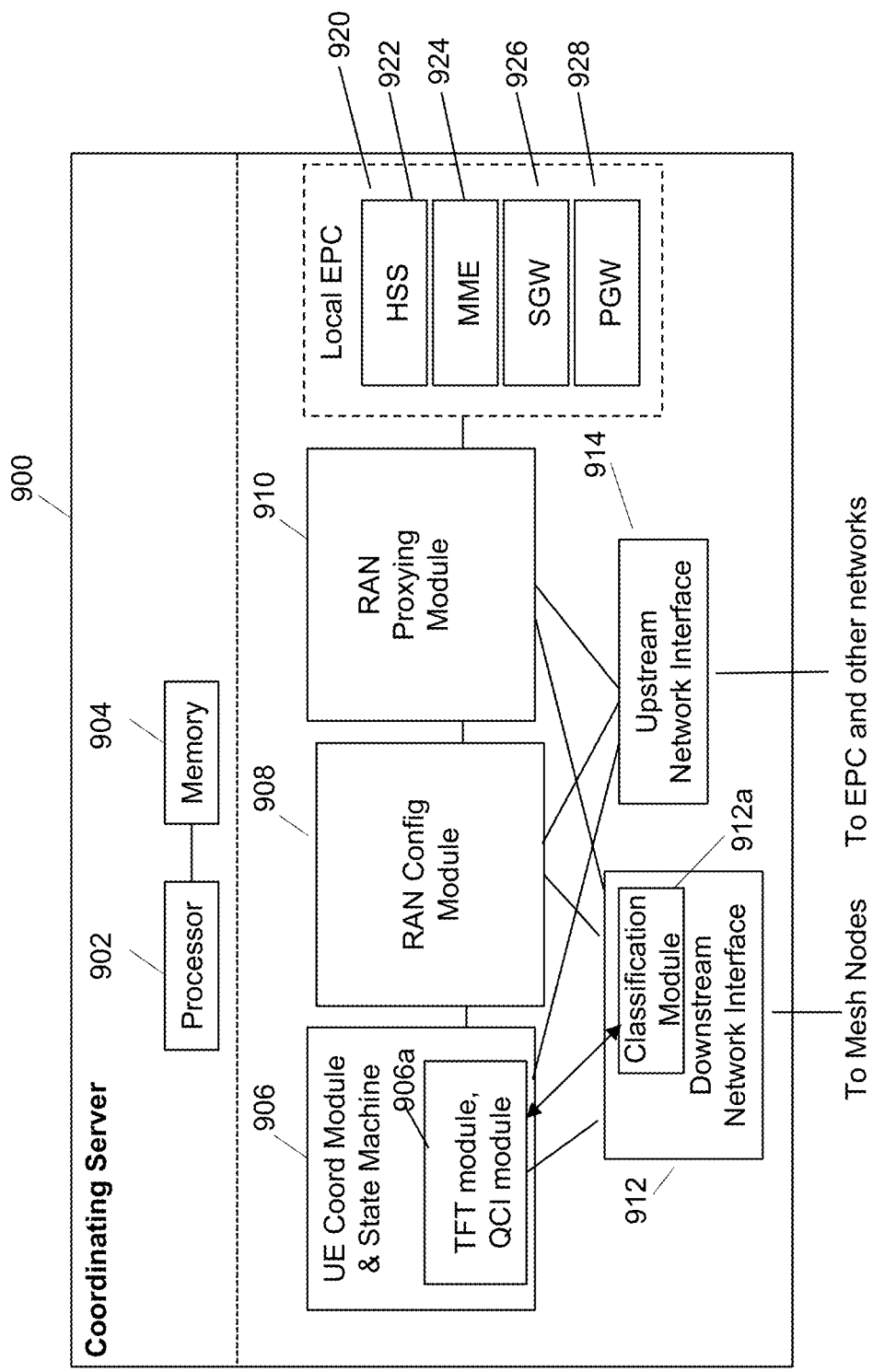
FIG. 9 is a schematic architecture diagram of an exemplary gateway, in accordance with some embodiments.

FIG. 9 is a schematic diagram of a coordinating node, in accordance with some embodiments. The coordinating node may also be known as coordinating server in this disclosure. Coordinating node 900 includes processor 902 and memory 904, which are configured to provide the functions described herein. Also present are UE coordination module and state machine 906, RAN configuration module 908, and RAN proxying 910. UE coordination module 906, and in particular TFT module/QCI module 906*a*, may perform the functions described herein for QOS management, including matching incoming traffic to bearers using filters and mapping IP options to DSCP or QCI values. RAN configuration module 908 may coordinate installed TFT filters across the network (e.g., at eNodeBs) with TFT module 906*a*. In some embodiments, coordination server may also provide proxying, routing virtualization and RAN virtualization, via module 910. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet). Downstream network interface 912 may further include classification module 912*a* in communication with TFT module/QCI module 906*a*. Classification module 912*a* may perform classification of traffic before sending messages to mesh nodes in the downstream direction. Signaling storm reduction functions may be performed in module 906. The coordinating node may be located in the network as shown in FIG. 1 as signaling coordinator 105.

Coordinating node 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

In some embodiments, the gateway of FIG. 9 may be a virtualized radio access network or may provide virtual network functions (VNFs). For example, the gateway of FIG. 9 may be equipped and provisioned to provide a cloud radio access network (CRAN) virtual network function (VNF), with real-time elastic scheduling, real-time X2 brokering, real-time self-organizing network (SON) capability with load balancing, mobile edge computing (MEC) capability, video traffic optimization, software defined networking (SDN) with unlicensed assisted backhaul and quality of experience (QoE) management. The VNFs provided on this gateway may be located at a particular hardware node or moved around in containers or virtual machines within a data center. The latency characteristics of the global scheduler described herein are flexible, as it is possible to provide helpful hints and hash keys for resources even with latencies of tens or hundreds of milliseconds. Therefore, the flexibility of a virtualized global scheduler is greater than that of a convention cloud radio access network (CRAN) infrastructure.

Alternatives

The below alternatives apply to one or more embodiments of the present disclosure.

Estimation and Adjustment

Estimation of the actual bandwidth and pipe size may be performed at the mesh gateway node, or at another node providing shaping as described herein, based on observed packet loss at the shaping node. It may be proper to underestimate the pipe rather than overestimate. Estimation and adjustment involves task of adjusting pipe parameters based on estimates. It may also track the WAN IPs for the gateway nodes and move the pipes accordingly. It may interwork with the routing protocol used on the mesh network, such as described in US20160308755A1, hereby incorporated by reference, in particular by providing the estimated bandwidth/pipe size to the routing algorithm.

Shaping may be influenced by the estimated bandwidth. For example, if an estimated minimum bandwidth is known to be required by a particular mesh node, an estimate for all mesh nodes and all types of traffic may be obtained at the mesh gateway node, and the mesh gateway node may then perform shaping to enable all types of traffic to pass through in an appropriate quantity or degree.

SON Interworking

Traffic shaping may be performed based on input to admission control and SON to adjust the cell parameters according to available bandwidth.

A Single Gateway Node

In some embodiments, instead of a mesh, a single node may be connected to a core network and may perform both the classification and shaping functions described herein. For example, an in-vehicle node may act as access node and gateway node for communicating with the core network.

The techniques described herein may still provide additional classification flexibility over the existing IP TOS- and QCI-based methods.

n SSIDs

In another alternate embodiment, in-vehicle nodes may act as a gateway network node. Traffic from multiple virtual access points (VAPs) would map to the same access categories and DSCP markings. However, Wi-Fi needs to have more of the bandwidth available to it when required. Traffic from different SSID may be prioritized differently and may be placed in a different bandwidth pipe having different priority queues.

Application Level Throttling

In another alternate embodiment, the mesh network nodes may perform traffic classification based on the source application of the message. This helps when an application from a source equipment is sending excessive messages under network congestion conditions or causing network congestion.

Virtual Tunnel Interfaces (VTIs)

Virtual tunnel interface (VTI) is specially built for tunneling. Use of VTI may allow shaping of traffic before sending the traffic on the interface. VTI offers many advantages. One such advantage is decoupling a lot of routing from IPSec leading to simpler routing. So, one has deals more with IP routing rules rather than transport selectors (TSELs). The other advantage is multicast traffic may be sent across IPSec tunnel. VTI does not require generic routing encapsulation (GRE) overhead. NAT, ACL, and QoS are done on unencrypted packets. Additionally, use of tcpdump is simplified.

Scenarios

In some embodiments, in the case of the use of an LTE interconnect, such as a direct connection to an LTE network, a TFT which would translate the TOS marking to an appropriate QCI value could be used. Also, it could be used with support of multiple bearers from the operator.

In some embodiments, in the case of an external modem LTE interconnect, a different UE modem could be used to connect to LTE backhaul, which could result in interconnection to the primary LTE network via a secondary LTE network (passthrough LTE network). Modem support for TFT and multiple bearer establishment may be used.

In some embodiments, in the case of backhaul using DSL or another backhaul infrastructure network, support of ToS markings in the interconnect network could be used, to supplement or stack with the present description.

Virtual tunnel interfaces (VTIs) could be used in conjunction with IPsec, in some embodiments. Estimation and adjustment of pipe size could be performed, in some embodiments. SON Interworking for admission control, Transmit Power adjustment etc. could be performed, in some embodiments. Handling the nodes behind NAT could be performed, in some embodiments. Shaping at non-gateway nodes could be performed, in some embodiments. Allowances for configurable categories could be enabled, in some embodiments. The same modem could link to different operators, who might have different TFTs and require different maps, in some embodiments. Application-level throttling could be performed, in some embodiments.

Downlink. A similar technique could be used on a backhaul connection in the downlink direction (i.e., from a core network to a mesh network node). Packets may be marked at the core network, for example, at a core network gateway such as a coordinating server or RAN controller as described herein, with the IP option header field described herein. The marked packets may be subject to appropriate filtering (using the methods described herein) at a first mesh gateway node or any subsequent mesh nodes on their way to their ultimate destination.

In some embodiments, arbitrary shaping, i.e., shaping independently of a global priority hierarchy scheme, may be performed. For example, shaping may be performed on a temporary basis to allow 3G voice data traffic to temporarily be given high priority while a user is on a call, with the shaping filter being turned off once the user is off the call.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa. The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
    receiving a first and a second Internet Protocol (IP) packet at a network node;
    tagging the first and the second IP packet at the network node based on a type of traffic by adding an IP options header to each of the first and the second IP packet;
    encrypting a payload of the first and the second IP packet at the network node;
    forwarding the first and the second IP packet toward a gateway node;
    filtering the first and the second IP packet at the gateway node based on the added IP options header by assigning each of the first and the second IP packet to one of a plurality of message queues, each of the plurality of message queues having a limited forwarding throughput; and
    forwarding the first and the second IP packet from the gateway node toward a mobile operator core network to be subsequently decrypted,
    thereby providing packet flow filtering based on IP header and traffic type, and using the added IP options header to provide traffic shaping independent from a priority assigned by a source node where the packet originated and independent of the encryption status of the packet.

2. The method of claim 1, further comprising receiving a third IP packet from a second network node; and filtering the third IP packet at the gateway node.

3. The method of claim 1, further comprising receiving the first IP packet from a cellular access network and the second IP packet from a wireless local area network access network.

4. The method of claim 1, further comprising receiving the first and the second IP packet from a plurality of user devices on at least two of a Long Term Evolution (LTE) eNodeB, a Universal Mobile Telecommunications System (UMTS) nodeB, a non-UMTS 3G base station, a Wi-Fi access point, or an IP-based telephony device.

5. The method of claim 1, further comprising subsequently removing the IP options header at the gateway node.

6. The method of claim 1, further comprising tagging based on the type of traffic for each of the first and the second IP packets and also based on at least one of, for each of the first and the second IP packets, a differentiated services code point (DSCP) value, an IP type of service (ToS) value, or a quality of service class identifier (QCI).

7. The method of claim 1, further comprising evaluating a differentiated services code point (DSCP) value or IP type of service (ToS) value of each of the first and the second IP packets; evaluating the type of traffic for each of the first and second IP packets; and ignoring the DSCP value or IP ToS value for purposes of tagging.

8. The method of claim 1, further comprising receiving the first and the second IP packets at a second network node and forwarding the first and the second IP packets toward the gateway node without removing the added IP options headers.

9. The method of claim 1, wherein the IP options header is an IPv4 option or an IPv6 extension header.

10. The method of claim 1, wherein the plurality of message queues are each logical queues within an IP processing layer at the gateway node, and wherein messages in the message queues are output onto a network link based on a desired traffic shaping policy.

11. A gateway node, comprising:
- an inbound interface for receiving data from a network node, the network node configured as a base station for providing wireless access to mobile devices;
- an outbound interface for sending data toward a mobile operator core network; and
- a processor configured to:
  - receive a first and a second Internet Protocol (IP) packet at a network node;
  - tag the first and the second IP packet at the network node based on a type of traffic by adding an IP options header to each of the first and the second IP packet;
  - encrypt a payload of the first and the second IP packet at the network node;
  - forward the first and the second IP packet toward a gateway node;
  - filter the first and the second IP packet at the gateway node based on the added IP options header by assigning each of the first and the second IP packet to one of a plurality of message queues, each of the plurality of message queues have a limited forwarding throughput; and
  - forward the first and the second IP packet from the gateway node toward a mobile operator core network, and using the added IP options header to provide traffic shaping independent from a priority assigned by a source node where the packet originated.

12. A non-transitory computer-readable medium comprising instructions which, when executed by a processor in a gateway node, cause the gateway node to perform steps comprising:
- receiving a first and a second Internet Protocol (IP) packet from a network node, the first and the second IP packet previously tagged at the network node based on a type of traffic by adding an IP options header to each of the first and the second IP packet;
- encrypting a payload of the first and the second IP packet at the network node;
- filtering the first and the second IP packet at the gateway node based on the added IP options header by assigning each of the first and the second IP packet to one of a plurality of message queues, each of the plurality of message queues have a limited forwarding throughput; and
- forwarding the first and the second IP packet from the gateway node toward a mobile operator core network, and using the added IP options header to provide traffic shaping independent from a priority assigned by a source node where the packet originated.

13. A non-transitory computer-readable medium comprising instructions which, when executed by a processor in a network node, cause the network node to perform steps comprising:
- receiving a first and a second Internet Protocol (IP) packet at the network node;
- tagging the first and the second IP packet at the network node based on a type of traffic by adding an IP options header to each of the first and the second IP packet;
- encrypt a payload of the first and the second IP packet at the network node; and
- forwarding the first and the second IP packet toward a gateway node for further filtering based on the added IP options header by assigning each of the first and the second IP packet to one of a plurality of message queues, each of the plurality of message queues have a limited forwarding throughput, and for forwarding toward a mobile operator core network, and using the added IP options header to provide traffic shaping independent from a priority assigned by a source node where the packet originated.

\* \* \* \* \*